United States Patent
Drosdeck

(10) Patent No.: US 12,131,531 B2
(45) Date of Patent: Oct. 29, 2024

(54) REAL TIME LIGHT-DETECTION AND RANGING POINT DECIMATION

(71) Applicant: LOCKHEED MARTIN CORPORATION, Bethesda, MD (US)

(72) Inventor: Jonathan Andrew Drosdeck, Middletown, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 355 days.

(21) Appl. No.: 17/847,615

(22) Filed: Jun. 23, 2022

(65) Prior Publication Data

US 2023/0419658 A1    Dec. 28, 2023

(51) Int. Cl.
| | | |
|---|---|---|
| *G06V 20/17* | (2022.01) | |
| *G06V 20/10* | (2022.01) | |
| *G08G 5/00* | (2006.01) | |

(52) U.S. Cl.
CPC ............ *G06V 20/17* (2022.01); *G06V 20/188* (2022.01); *G08G 5/003* (2013.01); *G08G 5/006* (2013.01)

(58) Field of Classification Search
CPC ...... G06V 20/17; G06V 20/188; G08G 5/003; G08G 5/006; G06T 2207/10028; G06T 7/70; G01S 17/931; G01S 17/89; G01S 17/86
See application file for complete search history.

(56) References Cited

U.S. PATENT DOCUMENTS

| | | | |
|---|---|---|---|
| 8,705,792 B2 * | 4/2014 | James | G06T 7/246 |
| | | | 348/169 |
| 10,078,335 B2 | 9/2018 | Mei et al. | |
| 2005/0052451 A1 | 3/2005 | Servantie | |
| 2010/0208941 A1 | 8/2010 | Broaddus et al. | |
| 2012/0274505 A1 | 11/2012 | Pritt et al. | |
| 2018/0275658 A1 * | 9/2018 | Iandola | G06F 18/241 |
| 2019/0120964 A1 * | 4/2019 | Luo | G01S 7/4817 |
| 2019/0129039 A1 * | 5/2019 | Schubert | G08G 5/0021 |
| 2019/0139403 A1 * | 5/2019 | Alam | G08G 1/0112 |

(Continued)

FOREIGN PATENT DOCUMENTS

EP    3 506 212 A1    7/2019

OTHER PUBLICATIONS

"Splay Tree", Wikipedia, Jun. 9, 2022, https://web.archive.org/web/20220609213254/https://en.wikipedia.org/wiki/Splay_tree (16 pages).

(Continued)

*Primary Examiner* — Dung Hong
(74) *Attorney, Agent, or Firm* — Foley & Lardner LLP

(57) ABSTRACT

Real-time light-detection and ranging point decimation is provided. A system of a vehicle can allocate, based on a resolution for data points, a region in the memory for a tree data structure. The region can have a fixed-size for a duration of a flight performed by the vehicle. The system can receive, subsequent to allocating the region in the memory, first points captured by a sensor of the vehicle at a first resolution, and convert the points to second points having a second resolution that is less than the first resolution. The system can then provide, for storage in the region in the memory, the tree data structure that stores the second points. The tree data structure can be used in a terrain map generation function.

20 Claims, 5 Drawing Sheets

(56) References Cited

U.S. PATENT DOCUMENTS

| | | | | |
|---|---|---|---|---|
| 2019/0162856 A1* | 5/2019 | Atalla | | G01S 17/42 |
| 2020/0132822 A1* | 4/2020 | Pimentel | | B64U 10/14 |
| 2020/0393567 A1* | 12/2020 | Schroeter | | G01S 19/01 |
| 2021/0011163 A1* | 1/2021 | Zhang | | G01S 13/865 |
| 2021/0133997 A1 | 5/2021 | Abeywardena | | |
| 2021/0221398 A1 | 7/2021 | Korobkin et al. | | |
| 2021/0223373 A1 | 7/2021 | Korobkin et al. | | |
| 2022/0025404 A1 | 1/2022 | Perkins et al. | | |
| 2022/0046280 A1* | 2/2022 | Iguchi | | H04N 19/46 |
| 2022/0301203 A1 | 9/2022 | Ambrus et al. | | |
| 2022/0335279 A1* | 10/2022 | Tyagi | | G06N 20/00 |
| 2023/0384454 A1* | 11/2023 | Beaurepaire | | G01S 17/87 |
| 2023/0419657 A1 | 12/2023 | Drosdeck | | |
| 2023/0419658 A1 | 12/2023 | Drosdeck | | |
| 2024/0160222 A1* | 5/2024 | Verma | | G06T 7/70 |

OTHER PUBLICATIONS

Extended European Search Report on European Patent Application No. 23175040.7 dated Nov. 17, 2023 (10 pages).
Extended European Search Report on European Patent Application No. 23175043.1 dated Nov. 9, 2023 (11 pages).
Lunar et al., "Distributed Ray Tracing for Rendering Voxelized LIDAR Geospatial Data", ERK 2016, Portoroz, Sep. 1, 2016, pp. 55-58.
Notice of Allowance on U.S. Appl. No. 17/847,607 dated Sep. 16, 2024 (9 pages).

* cited by examiner

REAL TIME LIGHT-DETECTION AND RANGING POINT DECIMATION

FIELD OF THE DISCLOSURE

This disclosure relates to light-detection and ranging (LiDAR) systems of aerial vehicles.

BACKGROUND

Information about the environment can be captured by sensors in an aerial vehicle. Real-time processing of sensor information is challenging due to the large volume of information that is captured from multiple sensors.

SUMMARY

The systems and methods of this technical solution provide techniques for real-time LiDAR point decimation. Aerial vehicle sensors can generate a large volume of information (e.g., hundreds of thousands of points) per second. The quantity of raw data captured by aerial vehicle can saturate communications interfaces of such aerial vehicles, making it challenging to process, store, and provide this information in real-time. To address such issues, the systems and methods of this technical solution can provide a tree data structure in a fixed-sized region of memory allocated prior to gathering sensor data. The vehicle processing system can filter and store the sensor in the tree data structure based on coordinate values of each of the points. Conversion procedures can also be applied to the raw sensor data to reduce the memory requirements for the tree data structure. The present techniques allow for processing and storage from multiple, high-resolution sensors on an aerial vehicle in real-time, which is not possible with approaches that do not implement the present techniques due to the excessive computational resources required. Therefore, the present techniques provide a technical improvement to the functioning of sensor data processing systems.

At least one aspect of the present disclosure relates to a method for real-time sensor data decimation. The method can be performed, for example, by one or more processors coupled to memory of an aerial vehicle. The method can include allocating, based on a resolution for data points, a region in the memory for a tree data structure. The region can have a fixed-size for a duration of a flight performed by the vehicle. The method can include receiving, subsequent to allocating the region in the memory, sensor data including a plurality of first points captured by a sensor of the vehicle. Each of the plurality of first points can be associated with a respective coordinate value at a first resolution. The method can include converting the plurality of first points to a plurality of second points having a second resolution that is less than the first resolution, based on the respective coordinate value of each of the plurality of first points. The method can include providing, for storage in the region in the memory, the tree data structure that stores the plurality of second points.

In some implementations, the sensor data can be captured by a plurality of light-detection and ranging sensors. In some implementations, the tree data structure can be a splay tree data structure. In some implementations, converting the plurality of first points to the plurality of second points can include converting respective coordinate values of the plurality of first points at the first resolution to corresponding coordinate values at the second resolution. In some implementations, the method can include receiving a second set of sensor data including a plurality of third points. In some implementations, the method can include updating the tree data structure in the region in the memory based on the plurality of third points. In some implementations, the tree data structure can include a plurality of nodes indexed by at least one coordinate value at the second resolution.

In some implementations, the at least one coordinate value can include an (X, Y) coordinate-pair. In some implementations, generating the tree data structure can include adding at least one node to the tree data structure based on a respective X or Y coordinate value of a second point of the plurality of second points. In some implementations, a node of the plurality of nodes can include a list of Z-coordinate values. In some implementations, generating the tree data structure can include adding a Z-coordinate value of a second point of the plurality of second points to the list of Z-coordinate values of the node.

In some implementations, the Z-coordinate value can be a rolling average Z-coordinate value generated from at least two of the plurality of second points. In some implementations, an (X, Y) coordinate value of the node can match a respective (X, Y) coordinate value of the second point. In some implementations, the Z-coordinate value of the second point can include a rolling average of at least two Z-coordinate values of the plurality of second points.

At least one other aspect of the present disclosure is directed to a system for real-time sensor data decimation. The system can include one or more processors coupled to memory of an aerial vehicle. The system can allocate, based on a resolution for data points, a region in the memory for a tree data structure. The region can have a fixed-size for a duration of a flight performed by the vehicle. The system can receive, subsequent to allocating the region in the memory, sensor data including a plurality of first points captured by a sensor of the vehicle. Each of the plurality of first points can be associated with a respective coordinate value at a first resolution. The system can convert the plurality of first points to a plurality of second points having a second resolution that is less than the first resolution based on the respective coordinate value of each of the plurality of first points. The system can provide, for storage in the region in the memory, the tree data structure storing the plurality of second points.

In some implementations, the sensor data can be captured by a plurality of light-detection and ranging sensors. In some implementations, the tree data structure can be a splay tree data structure. In some implementations, converting the plurality of first points to the plurality of second points can include converting respective coordinate values of the plurality of first points at the first resolution to corresponding coordinate values at the second resolution. In some implementations, the system can receive a second set of sensor data including a plurality of third points. In some implementations, the system can update the tree data structure in the region in the memory based on the plurality of third points.

In some implementations, the tree data structure can include a plurality of nodes indexed by at least one coordinate value at the second resolution. In some implementations, the at least one coordinate value can include an (X, Y) coordinate-pair. In some implementations, generating the tree data structure can include adding at least one node to the tree data structure based on a respective X or Y coordinate value of a second point of the plurality of second points. In some implementations, a node of the plurality of nodes can include a list of Z-coordinate values. In some implementations, generating the tree data structure can include adding a Z-coordinate value of a second point of the plurality of second points to the list of Z-coordinate values of the node.

In some implementations, the Z-coordinate value can be a rolling average Z-coordinate value generated from at least two of the plurality of second points. In some implementations, an (X, Y) coordinate value of the node can match a respective (X, Y) coordinate value of the second point. In some implementations, the Z-coordinate value of the second point can include a rolling average of at least two Z-coordinate values of the plurality of second points.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g., disks or other non-transitory storage media) or intangible carrier media (e.g., communication signals). Aspects can also be implemented using suitable apparatus, which can take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
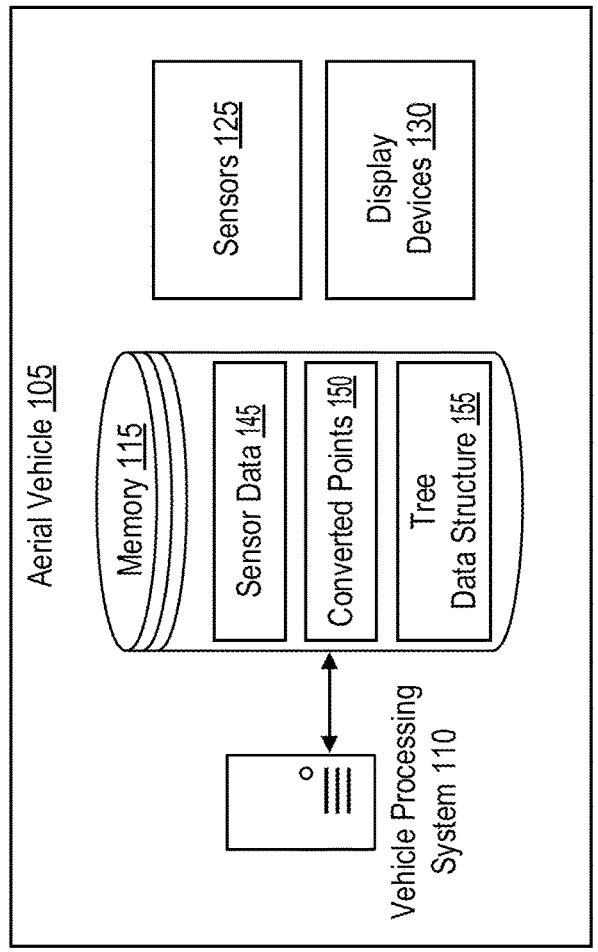
FIG. 1 illustrates a block diagram of a system for real-time sensor data decimation, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations can be utilized, and other changes can be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The systems, apparatuses, and methods described herein allow for real-time sensor data decimation, for example, using tree data structures in fixed-size regions of memory. Aerial vehicle sensors are capable of generating a large number of data points per second during operation. These data points are often processed into useful information, such as terrain maps, which can be used to assist an operator of the aerial vehicle when performing assigned missions or tasks. However, the quantity of data points produced by the sensors can exceed the available processing resources and memory capacity of on-board aerial vehicle computing systems. Often, generated data can be of greater resolution than needed for all processing operations or aerial vehicle tasks.

The systems and methods of this technical solution solve these and other issues by providing techniques for real-time sensor data decimation using tree data structures in fixed-size regions of memory. The present techniques include storing generated data points, following a resolution conversion process, into a tree data structure. Points in the data structure can be sorted or indexed based on corresponding properties of the sensor data. For example, LiDAR points can be indexed based on the Euclidean (X, Y) coordinates of the LiDAR points. Nodes in the tree data structure storing LiDAR data can each include an array that stores Euclidean Z coordinates, along with the averaged intensity and hit count at each unique Z. Sensor data points are able to be inserted at variable resolutions depending on hardware capability of the sensors or based on a fixed-size region of memory available for the tree data structure during operation.

Referring now to FIG. 1, illustrated is a block diagram of an example system 100 for real-time sensor data decimation, in accordance with one or more implementations. In brief overview, the system 100 can include at least one aerial vehicle 105. The aerial vehicle 105 can include at least one vehicle processing system 110, at least one memory 115, one or more sensors 125 and one or more display devices 130. The memory 115 can store sensor data 145, converted points 150, and a tree data structure 155. The vehicle processing system 110, the memory 115, the sensors 125, and one or more display devices 130 can be connected or communicatively coupled with one another. The vehicle processing system 110, the memory 115, the sensors 125, and the one or more display devices 130 can be implemented at least in part using one or more of the components of the computer system 500 described in connection with FIG. 5.

The aerial vehicle 105 can be any type of aerial vehicle, such as an airplane, a helicopter, a vertical take-off and landing (VTOL) aircraft, or any other type of aerial vehicle that includes one or more sensors 125. The aerial vehicle 105 can be equipped with any type of device or system that can be used to complete a task or mission that has been assigned to the aerial vehicle. The aerial vehicle can include one or more communications interfaces (not pictured), via which the aerial vehicle 105 or the vehicle processing system 110 can transmit information, including any of the information used in the techniques described herein.

The sensors 125 can be mounted on the interior or the exterior of the aerial vehicle 105. Non-limiting examples of the sensors 125 include LiDAR sensors, visible light sensors (e.g., cameras, video capture devices, etc.), infrared light sensors, accelerometers, gyroscopes, magnetometers, elevation sensors, pressure sensors, temperature sensors, force sensors, proximity sensors, radar sensors, angle-of-attack sensors, global positioning system (GPS) sensors, thermal infrared cameras, and thermal imaging cameras, among others. Sensor information can be retrieved from the sensors 125 by the vehicle processing system 110. In some implementations, one or more of the sensors 125 can provide sensor data 145 periodically (e.g., in a batch transmission, etc.) to the vehicle processing system 110. One or more of the sensors 125 can provide sensor data 145 to the vehicle processing system 110 upon receiving a corresponding request for sensor data 145 from the vehicle processing system 110. The sensors 125 can provide raw LiDAR measurements, which can be stored in the memory 115 as part of the sensor data 145. In some implementations, the vehicle processing system 110 can retrieve or receive raw data from the sensors 125, and store the raw data as part of the sensor data 145 for processing.

The aerial vehicle 105 can include various output devices, such as the display devices 130. The display devices 130 can include any type of device capable of presenting information to an operator of the aerial vehicle 105. The display devices 130 can be positioned within the aerial vehicle 105 such that they can be accessed by the operator during operation of the aerial vehicle 105. The display devices 130 can include devices that present specific sensor information, such as speed, direction, velocity, or location. The display devices 130 can present information relating to processed sensor data 145, including terrain maps, information relating to aerial vehicle operating conditions (e.g., altitude, velocity, orientation, etc.), and other aerial vehicle information. The display devices 130 can include general display devices that can present information, including any of the data described in connection with the present techniques. The display devices 130 can include an electronic flight instrument system (EFIS), which can include one or more primary flight displays, one or more multi-function displays, or other displays. The display devices 130 can include liquid crystal displays (LCDs), light-emitting diode (LED) displays, organic light-emitting diode (OLED) displays, bi-stable displays (e.g., e-ink, etc.), among others.

The memory 115 can be a computer-readable memory that can store or maintain any of the information described herein. The memory can maintain one or more data structures, which can contain, index, or otherwise store each of the values, pluralities, sets, variables, vectors, numbers, or thresholds described herein. The memory 115 can be accessed using one or more memory addresses, index values, or identifiers of any item, structure, or region maintained in the memory 115. The memory 115 can be accessed by the vehicle processing system 110. In some implementations, other computing devices present on the aerial vehicle 105 can access the memory 115. The vehicle processing system 110 can store the results of any or all computations in one or more data structures in the memory 115, such that the data structures are indexed or identified with appropriate values for later access. Various data structures stored in the memory 115 can be stored in fixed-size regions, which can be allocated at runtime, or in response to another condition, by the vehicle processing system 110 as described herein.

The memory 115 can store sensor data 145, for example, in one or more data structures indexed by an appropriate value, such as a timestamp corresponding to when a respective portion of the sensor data 145 was captured. The sensor data 145 can be stored by the vehicle processing system 110 upon receiving the sensor data from the sensors 125. The sensor data 145 can include LiDAR measurements, or points, captured from LiDAR sensors. For example, the sensor data 145 can include one or more LiDAR coordinate points in a three-dimensional coordinate space (e.g., an X, Y, Z coordinate space, etc.). Each LiDAR data point in the sensor data 145 can include a corresponding intensity value, which indicates the intensity of the LiDAR return from the environment. The LiDAR points in the sensor data 145 can be raw measurements that can result from an actual LiDAR signal provided by the sensors 125, rather than a spurious return from the environment.

The sensor data 145 can also include data from other types of sensors, including location sensors (e.g., GPS coordinates of the aerial vehicle 105), aerial vehicle 105 velocity, acceleration, or orientation, among other types of sensor data. Sets of sensor data 145 can be generated for each scan of a region for which a terrain map is to be generated. Information in the sensor data 145 can be presented by the vehicle processing system 110 at the display devices 130. The LiDAR measurements stored as part of the sensor data 145 can be stored as temporary values, which can be overwritten by new information as it is received from the sensors 125, or as the sensor data 145 is processed into the converted points 145 using the techniques described herein. The LiDAR points can be high-resolution data points, which can reflect a higher resolution than needed for various aerial vehicle applications, tasks, or missions.

The memory 115 can store one or more converted points 150, for example, in one or more data structures. The converted points 150 can be generated from LiDAR points in the sensor data 145, and can have a different resolution from the LiDAR points in the sensor data 145. The vehicle processing system 110 can generate the converted points 150, for example, in response to receiving the sensor data 145. In some implementations, the vehicle processing system 110 can generate the converted points 150 from sensor data 145 that indicates hits on the environment. Hits are LiDAR points that correspond to actual terrain measurements rather than spurious returns. As such, the vehicle processing system 110 to perform a preliminary filtering step on the sensor data 145 to eliminate spurious returns, and then generate the converted points 150 from the filtered sensor data 145.

To filter the sensor data 145, the vehicle processing system 110 can perform a ray-tracing process to detect spurious returns and filter the sensor data 145 that does not correspond to the points. As described herein, the vehicle processing system 110 can generate converted points 150 at a different resolution than the resolution of the data points in the sensor data 145. This can effectively reduce the number of data points that are ultimately inserted into the tree data structure 155 using the techniques described herein. A resolution for data points captured by LiDAR sensors can be the smallest interval in a three-dimensional coordinate that can be represented between two different data points. As used herein, data points having a "smaller" resolution represent larger, coarser intervals between points, while a "greater" or "larger" resolution represents a smaller interval, and is therefore relatively more precise than points having a smaller resolution. However, for many aerial vehicle tasks, a coarser or smaller resolution is sufficient. Therefore, the vehicle processing system 110 can utilize the techniques described herein to generate converted points 150 from the data points in the sensor data 145. The converted points 150 can have a smaller resolution than that of the data points in the sensor data 145.

The converted points 150 can each include a respective set of (X, Y, Z) coordinates that specify a Euclidean position of a hit on terrain in a corresponding three-dimensional space. The vehicle processing system 110 can store sets of converted points 150 in respective data structures. For example, each set of converted points 150 can correspond to a single LiDAR scan from a particular sensor 125, or a single set of LiDAR scans from a set of sensors 125 over a particular period of time. The converted points 150 can be stored in association with an identifier of the time period during which the converted points 150 were captured and one or more identifiers of the sensors 125 that contributed sensor data 145 to generate the converted points 150. Each of the converted points 150 can include the intensity value of the data point in the sensor data 145 from which the converted point was generated.

The memory 115 can store a tree data structure 155, for example, in a fixed-size region of the memory 115. The fixed-size region can be allocated by the vehicle processing system 110 in a boot-up sequence, as the aerial vehicle 105 is preparing for takeoff, or in response to a request (e.g., in response to user input, from another system of the aerial vehicle 105, etc.). The fixed-size region of memory can be pre-allocated prior to the capturing of sensor data 145 by the sensors 125 of the aerial vehicle 105. The tree data structure 155 can include one or more nodes, each of which can represent one or more sets of coordinate points that may be used in connection with a terrain generation process. Nodes can be created or updated based on the converted points 150 generated by the vehicle processing system 110. Each node may include an association (e.g., a pointer, reference, or identifier) of another node in the tree data structure 155. Each node may represent a respective coordinate pair (e.g., an (X, Y) coordinate pair) of a particular resolution. The resolution of the coordinate points in the tree data structure 155 can be predetermined, or determined based on the size of the fixed region of memory in which the tree data structure 155 is stored and updated. Each node in the tree data structure 155 can represent a single (X, Y) coordinate pair, and the nodes can be indexed in the tree data structure 155 based on the (X, Y) coordinate values represented by the nodes.

The nodes of the tree data structure 155 can be generated or updated to represent sensor data points of a reduced resolution that are generated from the converted points 150. The tree data structure 155 allows for efficient storage and update speed of sensor data 145, which may be used in a terrain mapping process. To represent a set of coordinate points in a node, a node can include a list of Z coordinate values, and a corresponding count value for each Z coordinate. Together with the (X, Y) coordinates represented by the node itself, each entry in the list of Z coordinates can correspond to a respective (X, Y, Z) coordinate value at the reduced resolution.

When the vehicle processing system 110 adds a point of the reduced resolution to the tree data structure 155, and a node having a matching (X, Y) coordinate pair of the point is present in the tree data structure 155, the vehicle processing system 110 can update the counter value in the list of Z coordinates indexed by the Z coordinate value of the point. If a node having the (X, Y) coordinate (at the reduced resolution) is not present, the vehicle processing system 110 can add a node having the (X, Y) coordinate to the tree data structure 155, and can re-organize the tree data structure 155 according to a tree data structure function. For example, the tree data structure 155 can be a splay tree, and the vehicle processing system can add a node to the tree data structure 155, store associations between the nodes, and re-organize the nodes in the tree data structure 155 according to a splay tree data structure function. The nodes can each be indexed, sorted, or otherwise arranged in the tree data structure 155 based on the single (X, Y) coordinate pair identified by the node. For example, the nodes can be indexed first by the size of the X value in the (X, Y) coordinate pair, and then by the size of the Y value in the coordinate pair, if needed. However, it should be understood that other indexing techniques are also possible, including any combination or index order of X, Y, and Z values of points represented by each nodes.

The vehicle processing system 110 can include at least one processor and a memory (e.g., a processing circuit). The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The vehicle processing system 110 can communicate with any of the components of the aerial vehicle 105, including the memory 115, the sensors 125, the display devices 130, and one or more communication interfaces (not pictured), to perform the operations described herein. The vehicle processing system 110 can include any or all of the components and perform any or all of the functions of the computer system 500 described in connection with FIG. 5.

Referring now to the operations of the vehicle processing system 110, the vehicle processing system 110 can allocate, based on a resolution of the converted points 150, a region in the memory 115 for the tree data structure 155. The tree data structure 155 can be a splay tree data structure. Allocating the region of memory can be performed, for example, in response to a boot-up process, or in response to the vehicle processing system 110 initiating a task relating to the capturing of sensor data 145 from the sensors 125. The region of memory allocated by the vehicle processing system 110 can be a region of memory that is of a fixed-size, meaning that it is not dynamically increased or decreased in size during operation of the aerial vehicle processing system 110. The region of memory can be a fixed size to accommodate for aerial vehicle compliance requirements. A fixed size region of memory can reduce errors, faults or other technical issues that may arise during operation, thereby improving the reliability of computing infrastructure used to facilitate operation or navigation of the vehicle. The size of the fixed region of memory may be determined by the vehicle processing system 110 based on the resolution of the converted points 150, which will be stored in the tree data structure 155.

The resolution for the converted points 150 is the smallest interval in a three-dimensional space that may be represented by the data points generated based on the sensor data 145. The allocated region of memory can have a size that is selected to accommodate a suitable number of the converted points 150 to perform one or more tasks, such as terrain mapping. Additionally, the size of the allocated region can be selected to further accommodate any values that may be stored as part of the nodes of the tree data structure 155, such as pointers or references to other nodes, (X, Y) coordinate index values, and lists of Z-coordinate values, as described herein. The memory can be allocated in response to one or more events, such as the vehicle processing system 110 being initiated, the sensors 125 being initiated, or upon a selection of a task by an operator of the aerial vehicle 105.

Upon allocating the region of memory, the vehicle processing system 110 can receive sensor data 145 including one or more points captured by a sensor 125 of the aerial vehicle 105. The sensor data 145 captured by the sensors 125 can include LiDAR signals, which can include, or can be used to generate, one or more points in a three-dimensional Euclidean coordinate space. The LiDAR signals can include signals received from LiDAR sensors correspond to terrain hits at distances ranging from 1 km to 10 km from the aerial vehicle. Receiving the sensor data 145 captured by the sensors 125 can include storing the sensor data 145 in the memory 115 in one or more data structures. Each data point of the sensor data 145 can include a three-dimensional coordinate (e.g., (X, Y, Z) coordinates, etc.). The (X, Y, Z) coordinates can represent coordinates captured in the resolution of the corresponding LiDAR sensor 125. The resolution of the sensor 125, and the sensor data 145 captured by the sensor 125, can be more precise than needed for one or more aerial vehicle tasks, such as terrain map generation. Therefore, in further processing steps, the vehicle processing system 110 can convert the data points to a second resolution to generate the converted points 150, which may be smaller (e.g., coarser, less precise) than the resolution of the data points in the sensor data 145.

The sensor data 145 can be stored in the memory 115 in a temporary region of memory, prior to processing using the techniques described herein to update the tree data structure 155. As such, the vehicle processing system 110 can receive and process the sensor data 145 in sets, which can each correspond to a respective scan by one or more LiDAR sensors 125. The vehicle processing system 110 can store and process sensor data 145 from a LiDAR scan using the techniques described herein, and then subsequently overwrite the sensor data 145 with additional sensor data 145 captured from further scans. The vehicle processing system 110 can therefore apply the techniques described herein to generate and update the tree data structure 155 in the fixed-size region of memory using sensor data 145 from multiple LiDAR scans over time.

After receiving the sensor data 145 from the sensors 125, the vehicle processing system 110 can convert the data points in the sensor data 145 to the converted points 150 at second resolution that is less than the first resolution based on the respective coordinate value of each of the plurality of first points. Converting the sensor data 145 to the converted points 150 can include converting respective (X, Y, Z) coordinate values of the data points at the resolution of the sensors 125 to corresponding (X, Y, Z) coordinate values at the second resolution of the converted points 150. The resolution of the converted points 150 (sometimes referred to herein as the "destination resolution" or the "second resolution") can be predetermined, or may be determined based on a target resolution of a terrain map generated using the tree data structure 155, or based on the processing capabilities of the vehicle processing system 110 or available storage capabilities of the memory 115. The vehicle processing system 110 can identify a destination resolution for the converted points 150 based on the size of the fixed-size region of the memory 115 used to store the tree data structure 155, or based on the rate at which the vehicle processing system 110 can process the points in the sensor data 145. A representation of the conversion of the sensor data 145 data points to the second resolution of the converted points is shown in FIG. 2.

Figure 2:
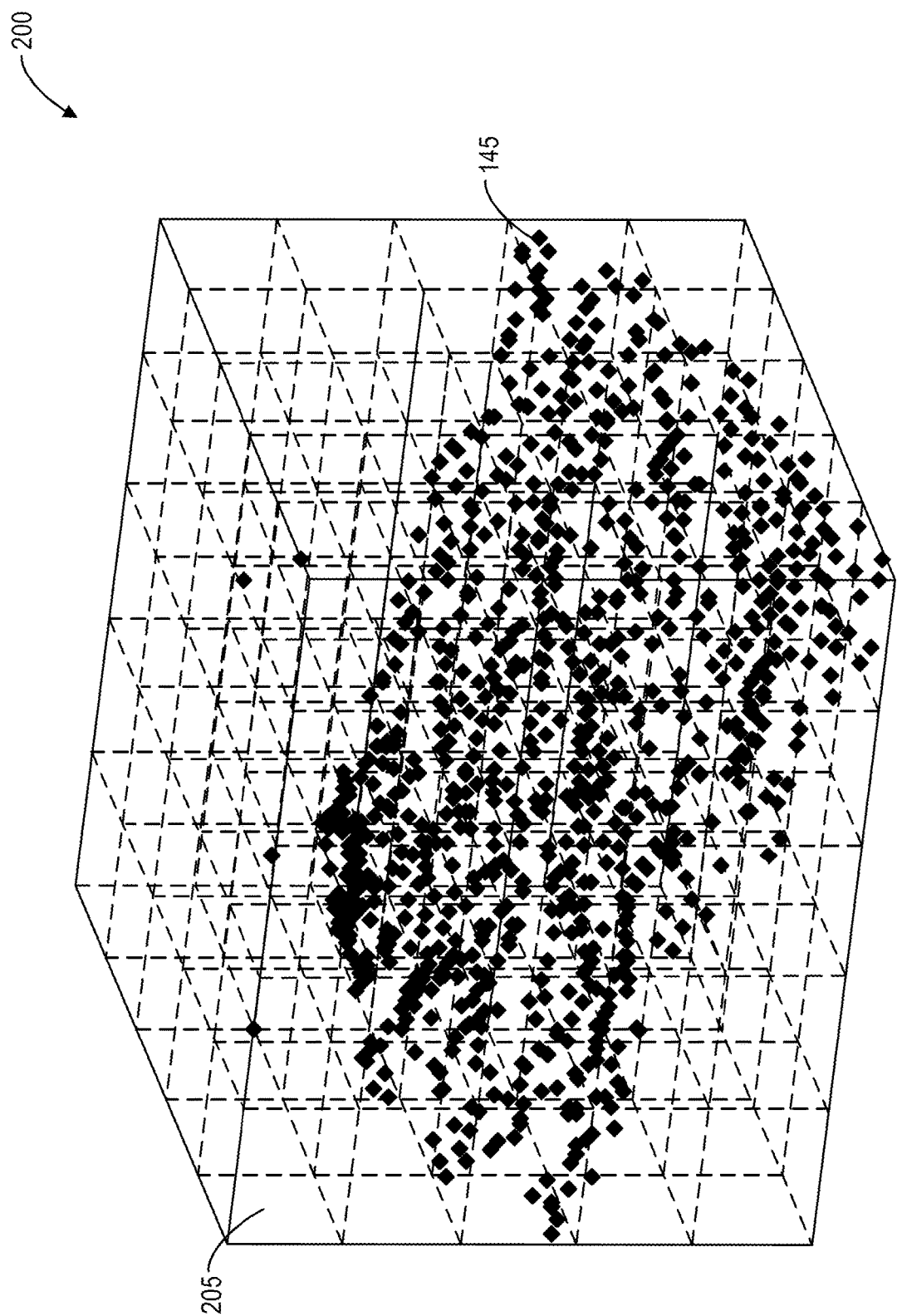
FIG. 2 illustrates an example representation of a mapping between sensor data of a first resolution to a grid having a second resolution, in accordance with one or more implementations.

Referring to FIG. 2, illustrated is an example representation of a mapping between sensor data 145 of a first resolution to a grid 200 having the second resolution of the converted points 150. As shown, the grid 200 has a number of cells 205, each of which can correspond to respective (X, Y, Z) coordinate values at the second resolution. The second resolution can be less than the first resolution of the sensor data points 145, meaning that the second resolution is less precise than the first resolution. The grid 200 shows that multiple sensor data points 145 can occupy the same cell 205 in the grid 200. Each of the sensor data points 145 in the same cell 205 will be converted to the same (X, Y, Z) coordinate value at the second resolution, even though they have different (X, Y, Z) coordinate values at the first resolution. This can effectively reduce the space required to store the sensor data points 145 as the converted points 150. However, because some aerial vehicle tasks, such as terrain mapping, may not utilize the full precision of the first resolution, no processing performance or overall system accuracy are lost from the conversion.

Figure 3:
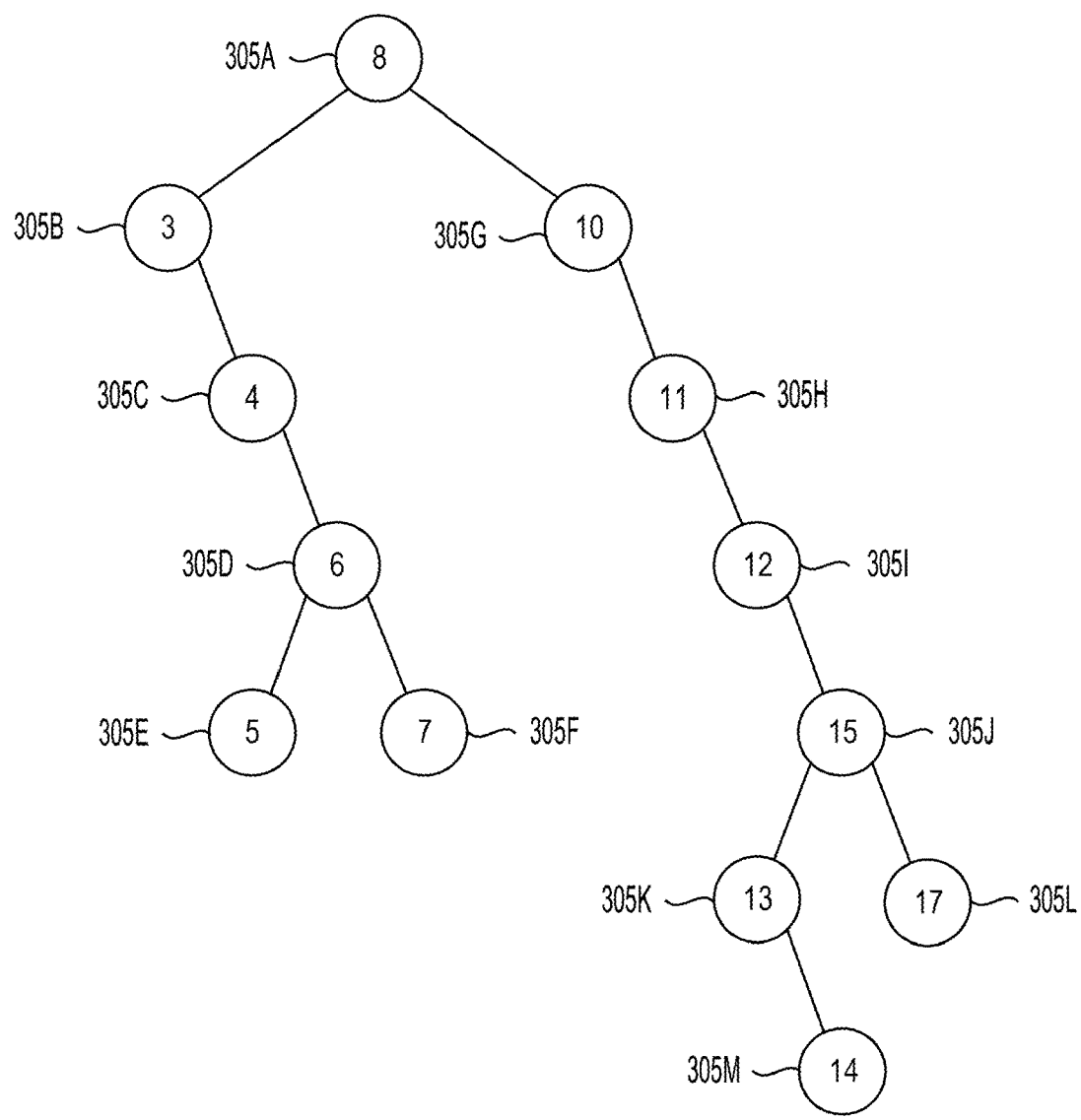
FIG. 3 illustrates a diagram of an example splay tree similar to those utilized with the techniques described herein, in accordance with one or more implementations.

Referring to FIG. 3, illustrated is an example representation of a splay tree 300, which may be similar to the tree data structure 155 described in connection with FIG. 1. A shown, the splay tree 300 includes the nodes 305A-305M (sometimes referred to as the "node(s) 305"), each of which correspond to a numerical value. The splay tree 300 can be a type of binary tree, such that each node 305 can have up to two connections to other nodes in the splay tree 300. As data points (e.g., the converted points 150 of FIG. 2) are added to the splay tree 300, nodes 305 are generated if the value of the data point is not already present in the splay tree 300. Data points can be inserted into the splay tree 300 using insertion techniques for a binary tree. After insertion, a splay operation can be performed, thereby placing the inserted node 305 at the root of the tree (shown here as the root node 305A).

Referring back to FIG. 1, the vehicle processing system 110 can convert the data points in the sensor data 145 by performing one or more conversion functions. The conversion functions may be rounding functions (e.g., to round one or more coordinate values to the destination resolution), division or multiplication operations (e.g., to divide the coordinate values into multiples of the destination resolution), or mapping operations (e.g., to project the coordinate values of the data points to the destination resolution). The vehicle processing system 110 can store the resulting set of points as the converted points 150. The converted points 150 can be generated and stored on a temporary basis, such that they are overwritten upon subsequent scans by the sensors 125 after updating the tree data structure 155.

Upon generating the converted points 150, the vehicle processing system 110 can utilize the techniques described herein to generate or update the tree data structure 155. The vehicle processing system 110 can provide the tree data structure 155 to store the converted points 150 in the region in the memory 115. The tree data structure 155 can be a splay tree data structures that includes one or more nodes.

Each node in the tree data structure 155 can represent a single (X, Y) coordinate pair at the destination resolution of the converted points 150. To provide the tree data structure 155, the vehicle processing system 110 can generate one or more nodes for the tree data structure by iterating through each of the converted points 150 generated from the sensor data 145. Nodes in the tree data structure 155 can be added or updated based on the coordinate values of each of the converted points 150. If the tree data structure 155 has not yet been generated, upon iterating over the first point of the converted points 150, the vehicle processing system 110 can generate a root node for the tree data structure that is indexed by the (X, Y) coordinate values of the first point.

When iterating through the converted points 150, the vehicle processing system 110 can update or add additional nodes to the tree data structure 155. For example, the tree data structure 155 can be a splay tree data structure. A splay tree is a self-adjusted binary search tree in which every operation on an element rearranges the tree so that the element is placed at the root position of the tree. One advantage of the splay tree is that nodes that are recently added or accessed are quick to access again. Because most points in a LiDAR scan of a binary search are close to one another, and form a uniform or otherwise continuous gradient representative of terrain, access patterns for the splay tree data structure improve overall performance of the system when inserting the converted points 150 into the tree data structure. If a node representing an (X, Y) coordinate pair of a converted point 150 is not currently in the tree data structure 155, the vehicle processing system 110 can generate a node that represents the (X, Y) coordinate pair in the tree data structure. The node can be inserted into the tree data structure according to a splay tree insertion function, which can generate associations between the newly added node and other nodes present in the tree data structure 155, and rearrange the nodes in the tree data structure according to the splay tree insertion function.

The splay tree data structure 155 can be a variant of a binary search tree, and therefore each node can include connections to zero, one, or two other nodes in the tree data structure 155. Nodes that do not include a reference to another node can be referred to as "leaf nodes." Generally, a node in a splay tree can include up to two connections to other nodes: one to a first node that has represents a value that is "greater," than that of the value represented by the node, and another to a second node that has a value that is "less" than that of the value represented by the node. The nodes in the tree data structure 155 can be indexed by two values, both X and Y coordinate values. To add a converted point to the splay tree, the vehicle processing system 110 can perform a search through the splay tree to first compare the X values of each node to the X coordinate of the converted point 150. If an X value is matched, the vehicle processing system can continue to compare Y value through further nodes in the tree to identify a node that represents the (X, Y) coordinate of the converted point.

If no such node exists, a node that represents the (X, Y) coordinate pair can be inserted into the splay tree, using a splay tree insertion function. The vehicle processing system 110 can then update the list of counters corresponding to Z coordinate values stored in association with the node. Updating a counter value corresponding to the Z-coordinate can include incrementing the counter by a predetermined number, indicating that there has been a hit detected at the (X, Y, Z) coordinate of the converted point. In some implementations, an additional counter corresponding to the hit intensity can be updated. For example, the vehicle processing system 110 can update the intensity by calculating a rolling average of all converted point 150 intensities that share the (X, Y, Z) coordinates of the converted point 150. Each node can therefore be associated with two respective lists of counter values, with each entry in the list corresponding to a respective Z coordinate: a counter indicating the number of hits, and a rolling average value corresponding to the rolling average of the (X, Y, Z) coordinate.

When a new node is added to the tree data structure 155, the vehicle processing system 110 can rearrange the tree data structure according to a splay tree insertion function. The splay tree insertion function can first insert the new node as a leaf node of the tree using binary search tree insertion logic. Then, after inserting the new node in the tree, the vehicle processing system can perform a splay operation on the newly added node, based on the (X, Y) coordinate values by which the node is indexed. As a result of the splay operation, the newly added node is positioned as the new root of the tree data structure 155. This can assist in quickly accessing and updating the tree data structure 155 with new nodes that have coordinate values that are similar to those of the newly added node. This is especially beneficial for the converted points 150, because the captured converted points are often close to one another in three-dimensional space due to the way the sensor data 145 is captured by the LiDAR sensors 125. After the new node has been added and the splay operation has been performed, the vehicle processing system 110 can update the Z-coordinate counter value and rolling average intensity value, as described herein.

The vehicle processing system 110 can iterate through each of the converted points 150 to update the tree data structure 155. The tree data structure 155 can be maintained in the fixed size region of memory, and can be updated to include point data for subsequent scans of LiDAR points captured by the sensors 125. After iterating through each of the converted points 150 in a scan, the vehicle processing system can scan through the tree data structure 155, to provide each stored point as input to a terrain map generation function. The terrain map generation function can generate a terrain map based on the coordinate values, the average intensity values, and the number of hits at each coordinate stored in the tree data structure. The vehicle processing system 110 can display the terrain map on one or more of the display devices 130. The terrain map generated from the tree data structure 155 can be presented as an overlay (e.g., a semi-transparent overlay) on a second, predetermined or previously generated map of the same region. This can allow an operator of the aerial vehicle 105 to view and access a terrain map that is generated in real-time, and to view the real-time terrain map in connection with a known map of the same region.

The advantages of the present techniques enable real-time (or near real-time) processing and storage of LiDAR sensor data. Implementations that do not utilize the present techniques suffer from poor performance, because on-board processing systems cannot store, organize, and efficiently process the large number of points generated by LiDAR sensors. By both converting the points to a lower resolution and by storing the converted points in the tree data structure 155 as described herein, the systems and methods of this technical solution provide a significant improvement over alternative approaches. Additionally, the present techniques can be implemented using a fixed-sized region of memory, rather than a dynamically resized region of memory. This enables the present techniques to be utilized in aviation contexts where dynamically allocated memory regions may be prohibited due to regulatory or compliance constraints.

Although the present techniques have been described in connection with aerial vehicles, it should be understood that the approaches described herein can be utilized in any type of vehicle, including any land-based vehicle.

Figure 4:
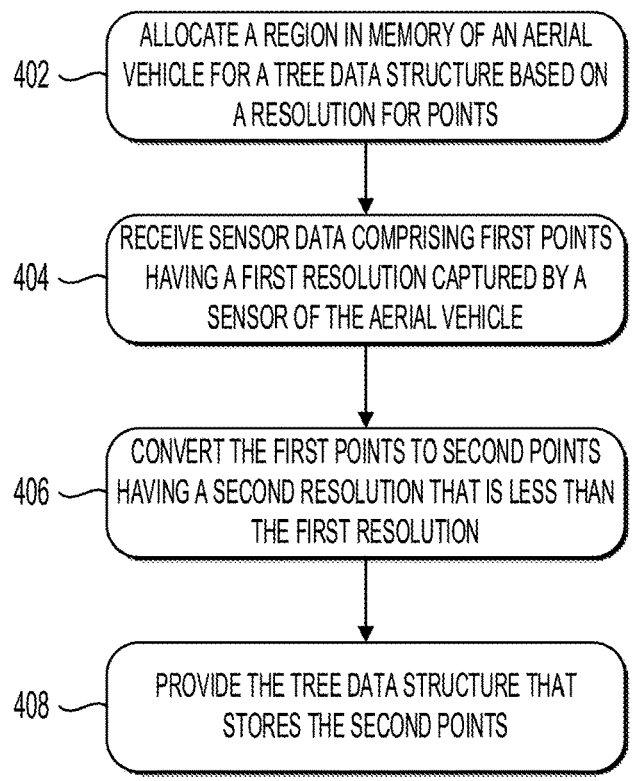
FIG. 4 illustrates a flow diagram of a method for real-time sensor data decimation, in accordance with one or more implementations.

Referring now to FIG. 4, depicted is an illustrative flow diagram of a method 400 for real-time sensor data decimation, in accordance with one or more implementations. The method 400 can be executed, performed, or otherwise carried out by the vehicle processing system 110 described in connection with FIG. 1, the computer system 500 described in connection with FIG. 5, or any other computing devices described herein. In brief overview, the method 400 can include allocating a region in memory of an aerial vehicle based on a resolution for data points (ACT 402), receiving sensor data including first points having a first resolution captured by a sensor of the aerial vehicle (ACT 404), converting the first points to second points having a second resolution that is less than the first resolution (ACT 406), and providing the tree data structure that stores the second points (ACT 408).

In further detail, the method 400 can include allocating a region in memory (e.g., the memory 115) of an aerial vehicle (e.g., the aerial vehicle 105) based on a resolution for data points (e.g., the converted points 150). (ACT 402). Allocating the region of memory can be performed, for example, in response to a boot-up process, or in response to a vehicle processing system (e.g., the vehicle processing system 110) of the aerial vehicle initiating a task relating to the capturing of sensor data (e.g., the sensor data 145 from the sensors (e.g., the sensors 125) of the aerial vehicle. The region of memory allocated by the vehicle processing system can be a region of memory that is of a fixed-size, meaning that it is not dynamically increased or decreased in size during operation of the aerial vehicle processing system. The region of memory can be a fixed size to accommodate for aerial vehicle compliance requirements. The size of the fixed region of memory may be determined by the vehicle processing system based on the resolution of converted points (e.g., the converted points 150) generated by the vehicle processing system as described herein, which will be stored in a tree data structure (e.g., the tree data structure 155).

The resolution for the converted points is the smallest interval in a three-dimensional space that may be represented by the data points generated based on the sensor data. The allocated region of memory can have a size that is selected to accommodate a suitable number of the converted points to perform one or more tasks, such as terrain mapping. Additionally, the size of the allocated region can be selected to further accommodate any values that may be stored as parts of the nodes of the tree data structure, such as pointers or references to other nodes, (X, Y) coordinate index values, and lists of Z-coordinate values, as described herein. The memory can be allocated in response to one or more events, such as the vehicle processing system being initiated, the sensors being initiated, or upon a selection of a task by an operator of the aerial vehicle.

The method 400 can include receiving sensor data including first points having a first resolution captured by a sensor of the aerial vehicle (ACT 404). Upon allocating the region of memory, the vehicle processing system can receive sensor data including one or more points captured by a sensor of the aerial vehicle. The sensor data captured by the sensors can include LiDAR signals, which can include, or can be used to generate, one or more points in a three-dimensional Euclidean coordinate space. The LiDAR signals can include signals received from LiDAR sensors correspond to terrain hits at distances ranging from 1 km to 10 km from the aerial vehicle. Receiving the sensor data captured by the sensors can include storing the sensor data in the memory in one or more data structures. Each data point of the sensor data can include a three-dimensional coordinate (e.g., (X, Y, Z) coordinates, etc.). The (X, Y, Z) coordinates can represent coordinates captured in the resolution of the corresponding LiDAR sensor. The resolution of the sensor, and the sensor data captured by the sensor, can be more precise than needed for one or more aerial vehicle tasks, such as terrain map generation. Therefore, in further processing steps, the vehicle processing system can convert the data points to a second resolution to generate the converted points, which may be smaller (e.g., coarser, less precise) than the resolution of the data points in the sensor data.

The sensor data can be stored in the memory in a temporary region of memory, prior to processing using the techniques described herein to update the tree data structure. As such, the vehicle processing system can receive and process the sensor data in sets, which can each correspond to a respective scan by one or more LiDAR sensors. The vehicle processing system can store and process sensor data from a LiDAR scan using the techniques described herein, and then subsequently overwrite the sensor data with additional sensor data captured from further scans. The vehicle processing system can therefore apply the techniques described herein to generate and update the tree data structure in the fixed-size region of memory using sensor data from multiple LiDAR scans over time.

The method 400 can include converting the first points (e.g., the data points in the sensor data 145) to second points (e.g., the converted points 150) having a second resolution that is less than the first resolution (ACT 406). After receiving the sensor data from the sensors, the vehicle processing system can convert the data points in the sensor data to the converted points at second resolution that is less than the first resolution based on the respective coordinate value of each of the plurality of first points. Converting the sensor data to the converted points can include converting respective (X, Y, Z) coordinate values of the data points at the resolution of the sensors to corresponding (X, Y, Z) coordinate values at the second resolution of the converted points. The resolution of the converted points (sometimes referred to herein as the "destination resolution" or the "second resolution") can be predetermined, or may be determined based on a target resolution of a terrain map generated using the tree data structure, or based on the processing capabilities of the vehicle processing system or available storage capabilities of the memory. The vehicle processing system can identify a destination resolution for the converted points based on the size of the fixed-size region of the memory used to store the tree data structure, or based on the rate at which the vehicle processing system can process the points in the sensor data.

The vehicle processing system can convert the data points in the sensor data by performing one or more conversion functions. The conversion functions may be rounding functions (e.g., to round one or more coordinate values to the destination resolution), division or multiplication operations (e.g., to divide the coordinate values into multiples of the destination resolution), or mapping operations (e.g., to project the coordinate values of the data points to the destination resolution). The vehicle processing system can store the resulting set of points as converted points. The converted points can be generated and stored on a temporary basis, such that they are overwritten upon subsequent scans by the sensors after updating the tree data structure.

The method 400 can include providing the tree data structure that stores the second points (ACT 408). The tree data structure can be a splay tree data structure that includes one or more nodes. Each node in the tree data structure can represent a single (X, Y) coordinate pair at the destination resolution of the converted points. To provide the tree data structure, the vehicle processing system can generate one or more nodes for the tree data structure by iterating through each of the converted points generated from the sensor data. Nodes in the tree data structure can be added or updated based on the coordinate values of each of the converted points. If the tree data structure has not yet been generated, upon iterating through the first point of the converted points, the vehicle processing system can generate a root node for the tree data structure that is indexed by the (X, Y) coordinate values of the first point.

When iterating through the converted points, the vehicle processing system can update or add additional nodes to the tree data structure. For example, the tree data structure can be a splay tree data structure. A splay tree is a self-adjusted binary search tree in which every operation on an element rearranges the tree so that the element is placed at the root position of the tree. One advantage of the splay tree is that nodes that are recently added or accessed are quick to access again. Because most points in a LiDAR scan of a binary search are close to one another and form a uniform or otherwise continuous gradient representative of terrain, access patterns for the splay tree data structure improve overall performance of the system when inserting the converted points into the tree data structure. If a node representing an (X, Y) coordinate pair of a converted point is not currently in the tree data structure, the vehicle processing system can generate a node that represents the (X, Y) coordinate pair in the tree data structure. The node can be inserted into the tree data structure according to a splay tree insertion function, which can generate associations between the newly added node and other nodes present in the tree data structure and rearrange the nodes in the tree data structure according to the splay tree insertion function.

The splay tree data structure can be a variant of a binary search tree, and therefore each node can include connections to zero, one, or two other nodes in the tree data structure. Nodes that do not include a reference to another node can be referred to as "leaf nodes." Generally, a node in a splay tree can include up to two connections to other nodes: one to a first node that represents a value that is "greater," than that of the value represented by the node, and another to a second node that has a value that is "less" than that of the value represented by the node. The nodes in the tree data structure can be indexed by two values, X and Y coordinates. To add a converted point to the splay tree, the vehicle processing system can perform a search through the splay tree to first compare the X values of each node to the X coordinate of the converted point. If an X value is matched, the vehicle processing system can continue to compare Y value through further nodes in the tree to identify a node that represents the (X, Y) coordinate of the converted point.

If no such node exists, a node that represents the (X, Y) coordinate pair can be inserted into the splay tree, using a splay tree insertion function. The vehicle processing system can then update the list of counters corresponding to Z coordinate values stored in association with the node. Updating a counter value corresponding to the Z-coordinate can include incrementing the counter by a predetermined number, indicating that there has been a hit detected at the (X, Y, Z) coordinate of the converted point. In some implementations, an additional counter corresponding to the hit intensity can be updated. For example, the vehicle processing system can update the intensity by calculating a rolling average of all converted point intensities that share the (X, Y, Z) coordinates of the converted point. Each node can therefore be associated with two respective lists of counter values, with each entry in the list corresponding to a respective Z coordinate: a counter indicating the number of hits, and a rolling average value corresponding to the rolling average of the (X, Y, Z) coordinate.

When a new node is added to the tree data structure, the vehicle processing system can rearrange the tree data structure according to a splay tree insertion function. The splay tree insertion function can first insert the new node as a leaf node of the tree using binary search tree insertion logic. Then, after inserting the new node in the tree, the vehicle processing system can perform a splay operation on the newly added node, based on the (X, Y) coordinate values by which the node is indexed. As a result of the splay operation, the newly added node is positioned as the new root of the tree data structure. This can assist in quickly accessing and updating the tree data structure with new nodes that have coordinate values that are similar to those of the newly added node. This is especially beneficial for the converted points, because the captured converted points are often close to one another in three-dimensional space due to the way the sensor data is captured by the LiDAR sensors. After the new node has been added and the splay operation has been performed, the vehicle processing system can update the Z-coordinate counter value and rolling average intensity value, as described herein.

The vehicle processing system can iterate through each of the converted points to update the tree data structure. The tree data structure can be maintained in the fixed size region of memory, and can be updated to include point data for subsequent scans of LiDAR points captured by the sensors. After iterating through each of the converted points, the vehicle processing system can scan through the tree data structure to provide each stored point as input to a terrain map generation function. The terrain map generation function can generate a terrain map based on the coordinate values, the average intensity values, and the number of hits at each coordinate stored in the tree data structure. The vehicle processing system can display the terrain map on one or more of the display devices. The terrain map generated from the tree data structure can be presented as an overlay (e.g., a semi-transparent overlay) on a second, predetermined, or previously-generated map of the same region. This can allow an operator of the aerial vehicle to view and access a terrain map that is generated in real-time in addition to a known map of a particular region.

Figure 5:
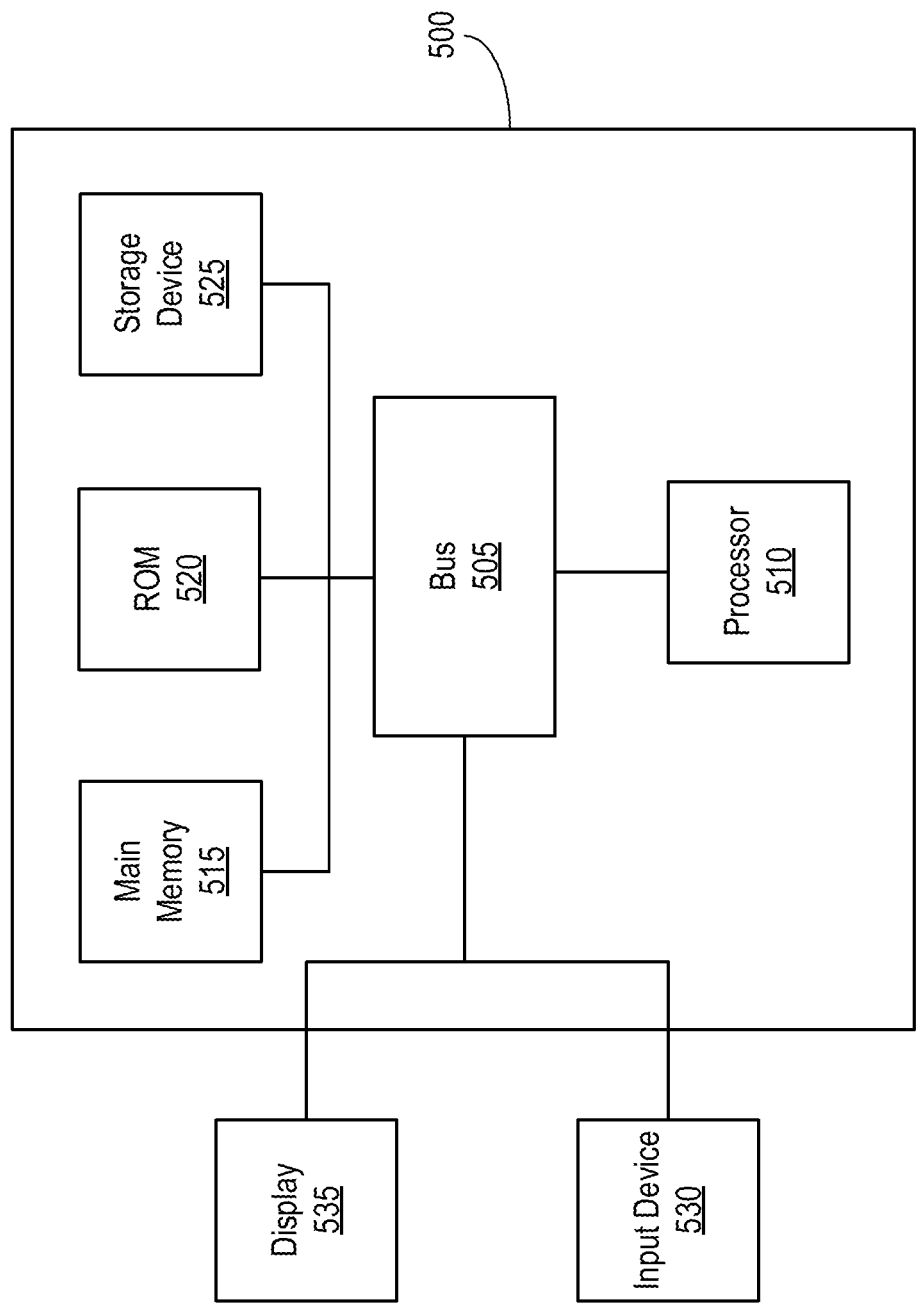
FIG. 5 illustrates a block diagram of an example computer system useful in implementing one or more components detailed herein.

Referring now to FIG. 5, depicted is a block diagram of an example computer system 500. The computer system or computing device 500 can include or be used to implement the system 100, or its components such as the vehicle processing system 110, described in connection with FIG. 1. The computing system 500 includes at least one bus 505 or other communication component for communicating information and at least one processor 510 or processing circuit coupled to the bus 505 for processing information. The computing system 500 can also include one or more processors 510 or processing circuits coupled to the bus 505 for processing information. The computing system 500 also includes at least one main memory 515, such as a random access memory (RAM) or other dynamic storage device, coupled to the bus 505 for storing information, and instructions to be executed by the processor 510. The computing system 500 can further include at least one read-only memory (ROM) 520 or other static storage device coupled to the bus 505 for storing static information and instructions for the processor 510. A storage device 525, such as a solid state device, magnetic disk, or optical disk, can be coupled to the bus 505 to persistently store information and instructions.

The computing system 500 can be coupled via the bus 505 to a display 535, such as a liquid crystal display, or active matrix display, for displaying information to a user such as an administrator of the data processing system. An input device 530, such as a keyboard or voice interface can be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the display devices 130, or other components of FIG. 1.

The processes, systems, and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement can also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, PROM, RAM, ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal (e.g., a machine-generated electrical, optical, or electromagnetic signal) for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices including cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory can be supplemented by, or incorporated in, special purpose logic circuitry.

The subject matter described herein can be implemented in a computing system that includes a back end component (e.g., as a data server), that includes a middleware component (e.g., an application server), that includes a front end component (e.g., a client computer having a graphical user interface or a web browser through which a user can interact with an implementation of the subject matter described in this specification), or a combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
    allocating, by one or more processors coupled to memory of a vehicle, based on a resolution for data points, a region in the memory for a tree data structure, the region having a fixed-size for a duration of a flight performed by the vehicle;
    receiving, by the one or more processors, subsequent to allocating the region in the memory, sensor data comprising a plurality of first points captured by a sensor of the vehicle, each of the plurality of first points associated with a respective coordinate value at a first resolution;
    converting, by the one or more processors, the plurality of first points to a plurality of second points having a second resolution that is less than the first resolution based on the respective coordinate value of each of the plurality of first points; and
    providing, by the one or more processors, for storage in the region in the memory, the tree data structure that stores the plurality of second points.

2. The method of claim 1, wherein the sensor data is captured by a plurality of light-detection and ranging (LiDAR) sensors.

3. The method of claim 1, wherein the tree data structure is a splay tree data structure.

4. The method of claim 1, wherein converting the plurality of first points to the plurality of second points comprises converting respective (X, Y, Z) coordinate values of the plurality of first points at the first resolution to corresponding (X, Y, Z) coordinate values at the second resolution.

5. The method of claim 1, further comprising:
    receiving, by the one or more processors, a second set of sensor data comprising a plurality of third points; and
    updating, by the one or more processors, the tree data structure in the region in the memory based on the plurality of third points.

6. The method of claim 1, wherein the tree data structure comprises a plurality of nodes indexed by at least one coordinate value at the second resolution.

7. The method of claim 6, wherein the at least one coordinate value comprises an (X, Y) coordinate-pair, and wherein generating the tree data structure comprises adding, by the one or more processors, at least one node to the tree data structure based on a respective X or Y coordinate value of a second point of the plurality of second points.

8. The method of claim 6, wherein a node of the plurality of nodes comprises a list of Z-coordinate values, and wherein generating the tree data structure comprises adding, by the one or more processors, a Z-coordinate value of a second point of the plurality of second points to the list of Z-coordinate values of the node.

9. The method of claim 8, wherein the Z-coordinate value is a rolling average Z-coordinate value generated from at least two of the plurality of second points.

10. The method of claim 8, wherein an (X, Y) coordinate value of the node matches a respective (X, Y) coordinate value of the second point.

11. The method of claim 8, wherein the Z-coordinate value of the second point comprises a rolling average of at least two Z-coordinate values of the plurality of second points.

12. A system, comprising:
    one or more processors coupled to memory of a vehicle, the one or more processors configured to:
        allocate, based on a resolution for data points, a region in the memory for a tree data structure, the region having a fixed-size for a duration of a flight performed by the vehicle;
        receive, subsequent to allocating the region in the memory, sensor data comprising a plurality of first points captured by a sensor of the vehicle, each of the plurality of first points associated with a respective coordinate value at a first resolution;
        convert the plurality of first points to a plurality of second points having a second resolution that is less than the first resolution based on the respective coordinate value of each of the plurality of first points; and
        provide, for storage in the region in the memory, the tree data structure that stores the plurality of second points.

13. The system of claim 12, wherein the sensor data is captured by a plurality of light-detection and ranging (LiDAR) sensors.

14. The system of claim 12, wherein the tree data structure is a splay tree data structure.

15. The system of claim 12, wherein to convert the plurality of first points to the plurality of second points, the one or more processors are further configured to convert respective (X, Y, Z) coordinate values of the plurality of first points at the first resolution to corresponding (X, Y, Z) coordinate values at the second resolution.

16. The system of claim 12, wherein the one or more processors are further configured to:

receive a second set of sensor data comprising a plurality of third points; and update the tree data structure in the region in the memory based on the plurality of third points.

17. The system of claim 12, wherein the tree data structure comprises a plurality of nodes indexed by at least one coordinate value at the second resolution.

18. The system of claim 17, wherein the at least one coordinate value comprises an (X, Y) coordinate-pair, and wherein to generate the tree data structure, the one or more processors are further configured to add at least one node to the tree data structure based on a respective X or Y coordinate value of a second point of the plurality of second points.

19. The system of claim 17, wherein a node of the plurality of nodes comprises a list of Z-coordinate values, and wherein to generate the tree data structure, the one or more processors are further configured to add a Z-coordinate value of a second point of the plurality of second points to the list of Z-coordinate values of the node.

20. The system of claim 19, wherein the Z-coordinate value is a rolling average Z-coordinate value generated from at least two of the plurality of second points.

* * * * *